United States Patent [19]

Marquardt et al.

[11] 4,347,704
[45] Sep. 7, 1982

[54] THERMAL POWER PLANT WATER TREATMENT PROCESS

[75] Inventors: Kurt Marquardt, Holzgerlingen; Heinz Ludwig, Sindelfingen, both of Fed. Rep. of Germany

[73] Assignee: Hager and Elsasser GmbH, Stuttgart, Fed. Rep. of Germany

[21] Appl. No.: 136,786

[22] Filed: Apr. 3, 1980

[30] Foreign Application Priority Data

Apr. 7, 1979 [DE] Fed. Rep. of Germany ....... 2914145

[51] Int. Cl.³ .................................. F01K 13/00
[52] U.S. Cl. ............................. 60/648; 60/690; 203/DIG. 20
[58] Field of Search ............ 60/648, 690, 692; 203/DIG. 20

[56] References Cited

U.S. PATENT DOCUMENTS 2,893,926  7/1959  Worthen ..................... 60/648 X
3,412,558  11/1968  Starrner ..................... 60/648 X
3,476,653  11/1969  Doland ....................... 60/648 X Primary Examiner—Alan Cohan

[57] ABSTRACT

The requirements and treatment costs of water used in a fossil fuel fired power station are reduced by a process which employs multiple reverse osmosis stages. This process also employs station waste heat to concentrate solid waste material to facilitate disposal thereof.

12 Claims, 1 Drawing Figure

THERMAL POWER PLANT WATER TREATMENT PROCESS

BACKGROUND OF THE INVENTION

1 Field of the Invention

The present invention relates to water treatment and particularly to reduction of the water treatment costs and water requirements of thermal power stations. More specifically, the present invention is directed to systems for the treatment of makeup water for the cooling and steam circulation systems of a thermal power station and also to apparatus for reducing undesirable discharges from such a power station. Accordingly, the general objects of the present invention are to provide novel and improved methods and apparatus of such character.

2 Description of the Prior Art

While not limited thereto in its utility, the present invention is particularly well suited for use in and as a process for the preparation of makeup water for the cooling water and steam circulation systems of an electrical power generation station while employs a fossil fuel fired steam generator. Such a power station will conventionally include condensing type turbines, wet cooling towers, a flue gas desulfurizer and an ash removal system. It is necessary, in the operation of such a power station, to provide makeup water for the cooling system and steam circulation systems and to treat the various waste water streams which result from plant operation.

The necessary cooling system makeup water for thermal power stations with wet recooling, which is almost exclusively derived from surface water available in the plant vicinity, must be mechanically and chemically treated so that it meets the plant operational requirements and also meets existing regulations with respect to the contaminant level of waste water discharges.

The state of the art of power station water treatment is believed to be exemplified by the informational brochure issued by the Raginisch Westfalischen Elektrizitatswerke Aktiengeselesschieft and describing the Neurath power station. This power station employs coal as its fuel. The requisite raw water for plant operation is stored in reservoirs and, prior to use, is passed through a decarbonizing station. The cooling water system of the power station is supplied with makeup water directly from the decarbonizing station. A part of the decarbonized water flow is pumped to a full demineralization station and, after passing through gravel, cation, anion, and mixed bed filters, serves as makeup water for the steam systems of the power station. The power station also includes apparatus which collects and desalinates the unusable condensate from various plant apparatii. The desalinated condensate and the makeup water from the demineralization station provides feed water for the power station condensate storage tanks.

Systems of the type briefly described above have the disadvantage that large quantities of waste water containing different amounts of soluble salts and undissolved solid substances are produced at different points within the power station. These different waste water streams have, for the most part, been purified in suitable separate water treatment units, thereafter discharged to drainage systems and usually find their way into the surface water. Thus, in the case of a thermal power station with circulation cooling; i.e., wet cooling towers; and flue gas desulfurization, the following differently contaminated waste water streams must be treated and discharged:

(1) Water resulting from the cooling system blowdown with a high salt content and sometimes with free chlorine and suspended substances.
(2) Regenerate from the steam generator water treatment; i.e., regenerate resulting from a full demineralization and condensate treatment; with high salt content and an excess of acids or alkalines.
(3) Waste water from the flue gas desulfurizer with high salt content and a high concentration of solids.
(4) Waste water or sludge from the makeup water treatment system for the cooling tower circulation system.
   (a) In the case of decarbonization with ion exchange, this waste water has a high salt content and an excess of acids.
   (b) In the case of decarbonization with lime alkali reacting sludge, this waste water has solid contents between 20 and 70% according to the dewatering process used.
(5) Filter washing water from the steam generator feed water treatment system and/or pre-cleaning units for makeup water treatment as well as eventual suspended substances from the cooling circulation system filtering plant for the individual water streams.
(6) Waste water from the ash cooling system with relatively high salt content and suspended substances.

In addition to the above listed waste water streams, quantities of waste water which contain a high level of solids as well as chemical contaminants are periodically produced. By way of example, when inspections occur piping and steam generator flushing waste water will be produced. Similarly, chemically contaminated waste water, either acid or alkaline, will result from steam generator pressure tests, cleaning procedures, etc. In comparison to the waste water quantities from the above-enumerated sources, however, the quantity of the intermittently occurring waste water is sufficiently small that it can be ignored.

When the alkaline method of operation is employed, the washing and regeneration water from the condensate treatment apparatus of the power station contains ammonium and hydrazine in differing quantities.

The state of the prior art with respect to treatment of the above listed individual waste water streams is as follows:

(a) When an excess of acid or alkali is present, neutralization will be performed in suitably large storage and neutralization basins and the neutralized water is discharged without the filterable substances resulting from the neutralization being removed therefrom.
(b) When the waste water contains precipitatable substances, sedimentation will be allowed to occur in suitable sedimentation basins, the clear water will be discharged and the precipitated sludge will either be directly dumped or mechanically dewatered and subsequently dumped.
(c) If the waste water has a high salt content, but does not contain either an excess of acids, alkalines or sediment, it is directly discharged.

(d) No effort is presently made to reduce the amount of ammonium or hydrazine in waste water containing these substances prior to dumping.

The largest single contributor to the total volume of waste water discharged from a power plant will comprise the blowdown water from the cooling tower circulation system. This blowdown water will typically have a high total salt content including a high concentration of chloride and sulfate.

A process for reducing the cooling water requirements of a thermal power station through the use of reverse osmosis has been described in the literature. In this process concentrated circulation water; i.e., blowdown water; is passed through a reverse osmosis unit, demineralized and the permeate is then returned to the cooling tower circulation system. As a result of the recycling of the permeate, which has a reduced salt content, the salt content of the water mixture comprising the permeate and treated water from a makeup water treatment system will correspondingly be reduced. Furthermore, some of the permeate from the reverse osmosis unit may be fed to the steam generator feed water treatment plant as pre-treated (demineralized) water. The previously known process employing reverse osmosis has been limited to application to the cooling circulation system, and to some extent to the steam generator feed water treatment system, and has had a limited effect insofar as reduction of the water costs incident to operation of a thermal power station.

SUMMARY OF THE INVENTION

The present invention overcomes the above briefly discussed and other deficiencies and disadvantages of the prior art by providing a process for the treatment of makeup water for the cooling water and steam circulation systems of a thermal power station wherein the waste water from the power station is treated in a manner whereby savings in both chemical consumption and plant operating costs result and potentially harmful plant discharges are minimized. The present invention also comprises apparatus for use in the practice of this water treatment process.

In accordance with a preferred embodiment of the present invention the concentrate from a reverse osmosis unit in the cooling tower makeup water treatment system is mixed with the blowdown water from the cooling tower circulation system and fed, preferably after heating, to a further reverse osmosis unit where the mixture is demineralized. The concentrate resulting from this further reverse osmosis treatment is subsequently treated in yet another reverse osmosis unit and the concentrate from that osmosis unit is heated in an evaporator by steam from the plant steam circulation system. The concentrate from the evaporation stage is thereafter stabilized to produce easily handled solid waste.

In the preferred embodiment of the present invention, the mixture of concentrate from the cooling tower makeup water treatment system and the cooling tower blowdown water is heated in a heat exchanger by the condensate from the above-mentioned evaporator. The condensate from this heat exchanger is subsequently mixed with the permeate from the reverse osmosis unit which treats the concentrate resulting from the reverse osmosis treatment of the aforementioned mixture of cooling tower blowdown water and concentrate from the cooling tower circulation system makeup water treatment stage. This mixture is then fully or partly treated in a conventional or continuously operated mixed bed steam generator feed water treatment unit.

Also in accordance with a preferred embodiment, the permeate from the reverse osmosis treatment step in the cooling tower blowdown water treatment system; i.e., from the reverse osmosis unit which acts on the mixture of the blowdown water and the concentrate from the cooling tower makeup water treatment system osmosis unit; is delivered into the cooling tower circulation system.

The present invention may also include subjecting the waste water resulting from the conventional steam generator feed water treatment to a hydrazine detoxification process and, subsequently, to an ammonium concentration step. The concentrated ammonia solution thus formed is fed back to the steam generator feed water treatment apparatus while the waste water from the ammonium concentration procedure is treated to remove heavy metal therefrom. After heavy metal removal, the waste water is fed to the above-mentioned evaporator. Alternatively, subsequent to heavy metal removal the waste water stream may be subjected to a reverse osmosis treatment and the permeate resulting from this osmosis treatment can be used as one of the input streams to the steam generator feed water treatment apparatus while the concentrate resulting from this reverse osmosis treatment will be delivered to the aforementioned evaporator.

The present invention also affords the opportunity to treat the waste water from the flue gas desulfurization system. Thus, in accordance with an embodiment of the invention, the sludge from the flue gas desulfurization unit sedimentation stage is washed by a portion of the treated water from the cooling tower makeup water treatment unit. This wash water is, subsequent to a softening or calcium removal treatment, subjected to a reverse osmosis treatment and the resulting permeate is fed back to the point in the system where the flue gas desulfurizer sludge is washed where it is mixed with the water from the cooling tower makeup water treatment unit. The regenerate resulting from the softening step is, as required, mixed with the concentrate from the immediately downstream reverse osmosis treatment stage and the resulting mixture may be delivered to the aforementioned evaporator as a waste water stream. Alternatively, all or a portion of the concentrate from the reverse osmosis unit downstream of the water softening stage may be fed back to the water softening unit for regeneration. It is also within the scope of the present invention to deliver the concentrate from the said downstream reverse osmosis unit to yet another reverse osmosis unit and to supply the concentrate from this further osmosis unit to the evaporator while its permeate is used as a portion of the sludge wash water.

The present invention further contemplates treatment of the cooling water discharged from the wet ash conveyor of a coal fired thermal power station. In one embodiment this ash cooling water is mixed with the backwashing water from the steam generator feed water treatment unit and the mixture is subsequently treated in either a raw water cleaning unit or in a separate flocculation and sedimentation stage prior to being mixed with the raw water input to the cooling tower makeup water treatment system.

Through the use of a reverse osmosis treatment for demineralizing the makeup water for the cooling tower circulation system, the total salt content and the chloride and sulfate contents of the available raw water may be reduced to one-tenth of their original value. The quantity of blowdown water required for a cooling tower is a function of the cooling tower evaporation losses and the impurity content of the cooling water, particularly the salt, chloride and sulfate contents of the raw water available to the plant, and may be expressed as follows:

$$A = V\left(\frac{S_z}{S_k - S_z}\right)$$

wherein,
A = Blowdown quantity (t/h)
V = Evaporation losses (t/h)
$S_z$ = Concentration of the makeup water (g/t)
$S_k$ = Limiting concentration in the circulation system (g/t)

It may thus be seen that the blowdown water quantity required is substantially reduced through reverse osmosis treatment of the cooling tower makeup water.

The present invention permits the thermal power plant operator to dispense with multi-stage full demineralization apparatus for the steam generator water treatment. Thus, in accordance with the present invention, the steam generator feed water treatment apparatus, which as previously described may be a mixed bed steam generator feed water treatment unit, receives only the following low salt content water streams:

(a) Permeate from the reverse osmosis unit which treats the concentrate from the cooling tower circulation system blowdown water treatment stage.
(b) Permeate from a reverse osmosis unit, if any, connected in series with the reverse osmosis unit mentioned in paragraph (a) above.
(c) Condensate from the evaporator used for concentrating high salt content waste water streams comprising:
(1) Concentrate from the reverse osmosis unit which treats the concentrate from the cooling tower circulation system blowdown water treatment stage.
(2) Waste water from a heavy metal removal stage which receives, after detoxification and ammonium concentration, the regenerate from the steam generator feed water treatment unit.
(3) Regenerate from the softening stage of the flue gas desulfurization waste water treatment system, when required, together with the concentrate from a downstream reverse osmosis unit in this desulfurization waste water treatment loop.

The present invention also encompasses the discovery that the quality of the permeate output of the reverse osmosis unit employed for blowdown water treatment can be considerably improved by heating the water stream delivered thereto.

The present invention reduces the requirements for chemicals used in treating the steam generator feed water since, as noted above, only pre-demineralized low salt content water is used for the feed water. Further, in the course of treatment of the waste water from the steam generator feed water treatment unit, ammonia is removed therefrom, concentrated and then fed back to the steam generator feed water unit as a conditioning chemical for use therein.

The use of permeate from the reverse osmosis unit employed for cooling tower makeup water treatment as wash water for the sludge produced during flue gas desulfurizing, which is a further novel feature of the present invention, results in a substantial reduction in the quantity of water required for washing the sludge since the wash water has a significantly reduced chloride content when compared to the raw water previously used for this purpose.

It is also to be noted that the removal of calcium ions from the flue gas desulfurization unit sludge washing water downstream of the washing stage enables this wash water to be concentrated by a factor of approximately 4 through a reverse osmosis treatment. Accordingly, as much as 75% of the sludge wash water is permeate which may be recirculated.

The present invention, accordingly, comprises a process and apparatus for use in the practice of that process which makes it possible, by means of coupling the various waste water streams from a thermal power station via interconnected systems and demineralization units, to achieve a number of significant improvements over the prior art. These improvements include:

(a) Waste water and all process water containing salts are, for all practical purposes, completely used by means of suitable internal circulation systems.
(b) Primarily through the use of physical concentration technology, the readily available and comparatively inexpensive energy sources at a thermal power station, such as electrical power and waste heat, are employed to achieve economical circulation of the individual water streams.
(c) Environmental pollution caused by waste water from a thermal power station is drastically reduced since almost all water is recirculated and only depositable solid substances must be discarded.
(d) The physical size of the steam generator feed water treatment plant may be significantly reduced through joining low salt content streams together for delivery to the feed water treatment apparatus. Thus, in accordance with the present invention demineralization of high salt content raw water through the use of costly multi-stage full demineralization technology is avoided and a condensate treatment unit, which in any event would be available, is used for plant condensate treatment.

Thus, the present invention advantageously combines a reduction of environmental pollution with a savings in water and a reduction in the cost of treatment of cooling water circulation system makeup water and steam generator feed water.

BRIEF DESCRIPTION OF THE DRAWING

The present invention may be better understood and its numerous advantages will become apparent to those skilled in the art by reference to the accompanying drawing considered in combination with the detailed description to follow and the information in tabular form annexed to the description. The drawing comprises a flow diagram of a preferred embodiment as employed in the cooling water and steam circulation systems of a power station having a coal fired steam generator, condensation type turbines, a wet type cooling tower, a flue gas desulfurization unit and wet ash conveyors.

DESCRIPTION OF THE PREFERRED EMBODIMENT

Figure 1:
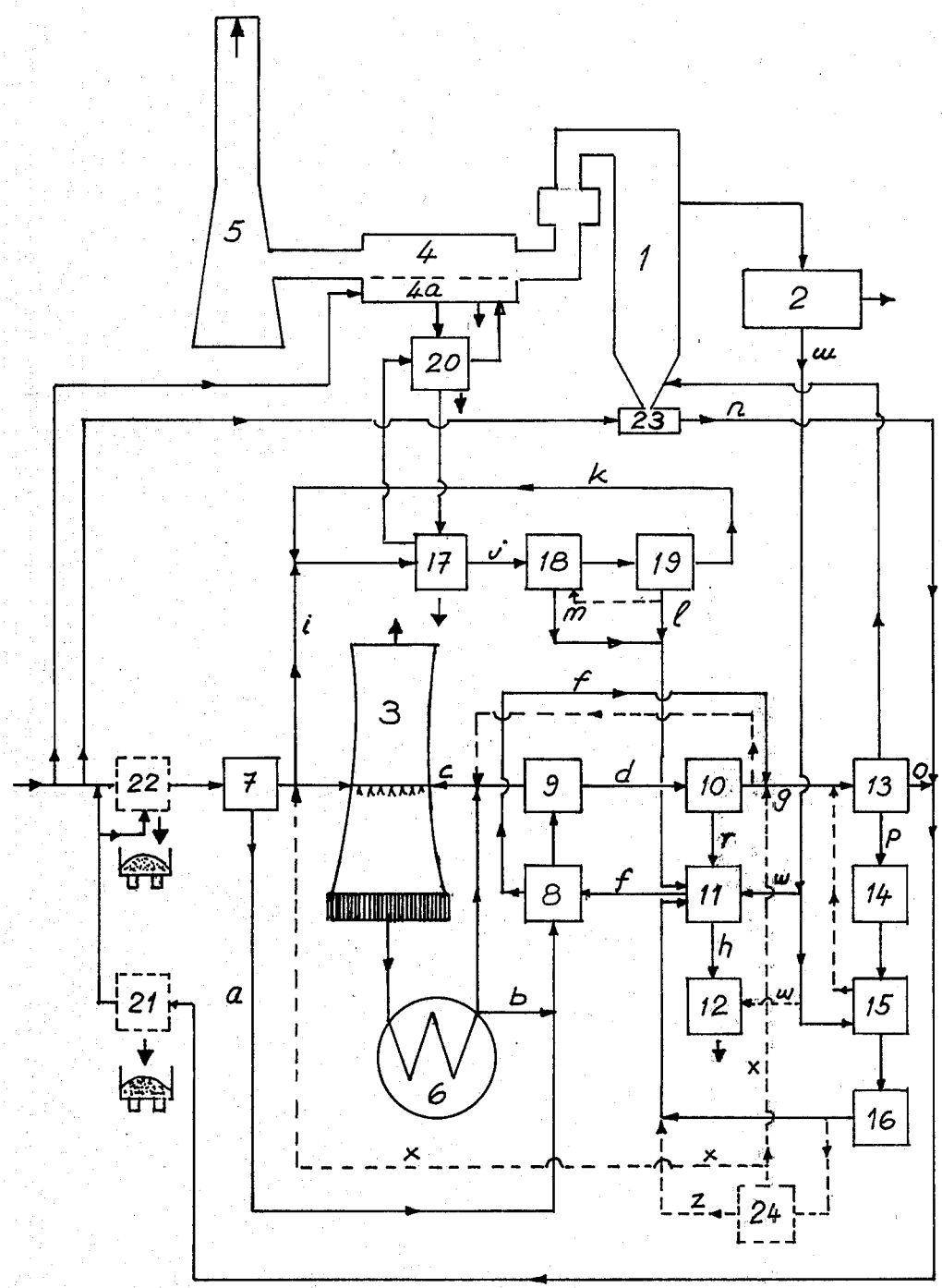

Referring to the drawing, a steam generator, which for purposes of explanation will be considered to be coal fired, is indicated schematically at 1. The steam produced by steam generator 1 is employed to drive a condensation type turbine indicated schematically at 2. The exhaust gases from steam generator 1 are delivered, via a flue gas desulfurization unit 4, to the exhaust stack 5. The flue gas desulfurizer 4 will typically include a gas washer which has been indicated at 4a. The condensate cooling water for turbine 2 is cooled in a wet type cooling tower which has been indicated schematically at 3. As indicated schematically at 6, a condenser is associated with the cooling tower 3 and the blowdown water "b" from the cooling tower circulation system will be discharged from the downstream side of condenser 6.

Raw water for power station operation is delivered from an available source to the gas washer 4a of the flue gas desulfurizer 4, to a steam generator wet ash conveyor 23 and to the treatment system to be hereinafter described. The first element of the treatment system of the disclosed embodiment of the present invention comprises a reverse osmosis unit 7. The concentrate "a" from reverse osmosis unit 7, which is operated with 75% permeate discharge, is mixed with a portion of the blowdown water "b" from the cooling tower circulation system and the mixture is then delivered, via a heat exchanger 8, to a further reverse osmosis unit 9. The permeate from reverse osmosis unit 7 functions as the primary water supply to cooling tower 3 and, since this permeate will have a very low salt content as well as a low concentration of chloride and sulfate, a portion of this permeate may be employed, in the manner to be described below, in a gypsum recovery system.

The reverse osmosis unit 9 will, like reverse osmosis unit 7, be comprised of modules containing membranes which permit 90% salt retention. As is the case with osmosis unit 7, reverse osmosis unit 9 will be operated with a 75% permeate discharge. The permeate "C" from osmosis unit 9 is delivered to the circulation system for cooling tower 3 as makeup water. Thus, in accordance with the present invention, the necessary output of the raw water treatment procedure; i.e, the required output of reverse osmosis unit 7; is reduced by the amount of desalinated water which comprises the permeate from osmosis unit 9. This permeate "C" will be added to that portion of the blowdown water from condenser 6 which is not mixed with the concentrate from osmosis unit 7.

The concentrate "d" from reverse osmosis unit 9 will be delivered to a further reverse osmosis unit 10. The total salt content of concentrate "d" will be very high and may reach a value of up to 10,000 g/t or more. Accordingly, it is both suitable and desirable to use membranes which have a salt retention of 99% in osmosis unit 10. The osmosis unit 10 is operated with a permeate discharge of about 40% and the concentrate "r" discharged from unit 10 will be delivered to an evaporator 11. The heat source for evaporator 11 is most economically the expanded steam "w" from turbine 2. Evaporator 11, in the manner to be described below, is also fed with other waste water streams. Evaporator 11 will produce, from steam "w", a hot condensate "f" with a low salt content. This hot condensate "f" is delivered to heat exchanger 8 wherein it heats the mixture comprising the cooling tower system blowdown water "b" and concentrate "a" from osmosis unit 7. The condensate "f" will, of course, be cooled by its passage through heat exchanger 8.

The permeate output of the reverse osmosis unit 9 is considerably improved by heating the incoming feed; i.e., through the use of the heat exchanger 8. However, if the thermal efficiency of the wet cooling tower will be adversely affected due to the feed to reverse osmosis unit 9 being heated, whereby the permeate "c" employed as makeup water to the cooling tower circulation system is at a temperature which is too high, the heat exchanger 8 may more advantageously be employed either to heat the permeate "g" from osmosis unit 10, which functions as the supply to a steam generator feed water treatment unit 13, or to heat the actual steam generator feed water as supplied by feed water treatment unit 13.

The permeate "g" from reverse osmosis unit 10 is mixed with the cooled condensate "f" from evaporator 11, subsequent to its passage through heat exchanger 8, and all or part of this mixture is delivered as the supply to the power station steam generator feed water treatment unit 13.

The waste water mixture resulting from the several feeds to evaporator 11 is concentrated in the evaporator to a value of about ten times its salt concentration. Accordingly, the concentrate "h" from evaporator 11 may have a salt concentration in the range of 15 to 20%. This concentrate may be delivered to a stabilization stage 12 for drying whereby the highly concentrated salt solution is converted to a form suitable for disposal. In this case, a portion of the steam "w" from turbine 2 will be employed as the heat source for the stabilization stage 12. However, and this is particularly true when further use of the salts in concentrate "h" is not intended; i.e., when they are not to be used as de-icing salt, etc.; chemical stabilization may be employed as an alternative or in addition to drying. In a chemical stabilization process a binding substance, for example, gypsum from the flue gas wash water, is added to the highly concentrated salt solution which is then, in coal fired power stations, mixed with ash. If the addition of the binder and/or the mixing with ash does not produce the requisite stabilization, a sludge dewatering step can be subsequently employed to provide a mixture having a solids content of 80–90%. Alternatively, a further drying stage can be employed, again using the waste steam "w", to produce solid products with low water content.

It is particularly noteworthy that the mixture of the permeate "g" from reverse osmosis unit 10 and the condensate "f" from evaporator 11 exhibits a very low salt content. Accordingly, this mixture may be used as steam generator feed water without the costly demineralization techniques which have characterized the prior art.

Waste water results from the generation in steam generator feed water treatment unit 13. This waste water regenerate "p" contains, depending on the design of the treatment plant, an excess of acids or alkalines and, with an alkaline mode of operation for the power station, large quantities of ammonia and hydrazine. The waste water; i.e., the regenerate "p"; is treated with chlorine in an alkaline medium having a pH value of 10 and the hydrazine is oxidized to nitrogen. The exercise of control over the chlorine added to the waste water from feed water treatment unit 13 is achieved by measuring the redox potential in the treatment basin of a detoxification unit 14. Subsequently the pH of the treated waste water is corrected to a value of 11–12 by the addition of soda lye and the waste water is then delivered to an ammonium concentration system 15. The ammonium concentration system 15 may be a stripper column or columns wherein the waste water is treated with waste steam "w" from turbine 2. In the manner known in the art, the ammonium present in the waste water will be vaporized in concentration system 15 and, as a result of its high degree of solubility in water, the ammonium will be absorbed. Through the use of multi-stage stripping and absorption of the ammonia, with an increasing number of stages, a concentrated ammonia solution can be obtained and this concentrated ammonia solution can be fed back to the steam generator feed water treatment plant 13 for conditioning the feed water when operating under alkaline conditions and for alkalescense of the steam-condensate circulation.

The regenerate "p" from feed water treatment unit 13, in addition to ammonia and hydrazine, will contain heavy metals such as copper, nickel and chromium. These heavy metals are precipitated as hydroxides during the neutralization of the waste water and can, together with other suspended solids which are present, be separated by means of sedimentation and subsequently disposed of as sludge. If the waste water "p" is largely free of solids, the heavy metals can be removed therefrom by means of filtration and selective ion exchange. The metals can subsequently be removed from the selective ion exchange unit in solid form by means of electrolysis. In either event, the system will include a heavy metal removal stage 16. The waste water exiting from stage 16 will be free of toxic material but, however, will have a high salt content. This waste water can be either delivered directly to evaporator 11 as one of the waste water feed streams thereto or may be passed through a further reverse osmosis unit 24 with the concentrate "z" from osmosis unit 24 being delivered as a waste water feed to evaporator 11. If reverse osmosis unit 24 is employed, the permeate "x" therefrom may be used as part of either or both of the feed to the feed water treatment unit 13 or as makeup water for the cooling tower circulation which is mixed with the permeate from osmosis unit 7.

If the concentrate "h" from evaporization stage 11 is stabilized and thereafter disposed of without the use of the salts contained therein, the waste water output from the ammonia concentration stage 15 may be delivered directly as one of the feed streams to evaporator 11; i.e., it is possible to dispense with the heavy metal removal stage 16.

As is well known in the art, very large quantities of calcium sulfate are deposited in the flue gas washers used to treat the exhaust gases from coal fired steam generators. In order to utilize, and thus not have to dispose of these large quantities of calcium sulfate, the common procedure is to wash the calcium sulfate free of chloride so that it may then be collected as pure gypsum and sold to gypsum processing companies. The gypsum sludge resulting from this washing procedure has a solid content of 50% dry substance. After a sedimentation process, clear water from the washing procedure may be returned to the flue gas washer which, as previously noted, is indicated at 4a. The calcium sulfate recovery system thus includes a sedimentation stage 20 and a de-watering stage 17 wherein the sludge is de-watered, typically in a centrifuge, and simultaneously washed. The gypsum wash water "i" for stage 17 is, as noted above, taken from the permeate output of osmosis unit 7. Use of this permeate as the gypsum was water is desirable, in order to meet the degree of purity demanded by the gypsum industry, since permeate "i" will have a low salt content and either be free of or have a very low concentration of chloride. Restated, the quantity of gypsum wash water necessary in order to achieve the residual chloride content, desired by the utilizers of pure gypsum is proportional to the chloride content of the water. Accordingly, the partial stream "i" of water treated in reverse osmosis unit 7, which has very low salt content as well as low concentrations of chloride and sulfate, is used as the wash water delivered to the de-watering (centrifuge) stage 17.

The gypsum washing water "j" discharged from stage 17 is saturated with calcium sulfate. This suspended calcium sulfate is filtered out of the water in a softening stage 18 to thereby reduce the calcium content of the water so that it can be fed to a reverse osmosis unit 19. Osmosis unit 19 will operate with a 70% permeate discharge. The permeate "k" from osmosis unit 19 is fed back to de-watering stage 17 where it is mixed with the wash water "i" from osmosis unit 7. Thus, to the extent possible, the gypsum wash water is recirculated. The concentrate "l" from reverse osmosis unit 19 is delivered, with the regeneration waste water "m" from softening stage 18, as a further waste water stream to evaporator 11. As an alternative, the mixed waste water streams "l" and "m" my be preconcentrated and delivered to a further reverse osmosis unit and the permeate from this further osmosis unit may then be fed back to the input to centrifuge 17.

As mentioned above, raw water; i.e., water without any pretreatment, is delivered to both the gas washer 4a of the flue gas de-sulfurizer and to the wet ash conveyor system 23. The ash cooling water "n" discharged from wet ash conveyor system 23 contains suspended matter and soluble substances from the ash. These soluble substances are primarily inorganic salts. The ash cooling water "n" is mixed with the back-washing water "o" from the steam generator feed water treatment unit 13. The back-washing water "o" also contains suspended matter as a result of the washing of the filters located in feed water treatment unit 13 upstream of the desalination section. The combined waste water streams "n" and "o" are mixed with the raw water upstream of reverse osmosis unit 7 and subsequently treated as described above. A flocculation and sedimentation stage 22 may be employed upstream of osmosis unit 7 if the composition of the raw water so requires. If pretreatment of the raw water is not necessary upstream of osmosis unit 7, or if the raw water is only filtered, the combined waste water streams "n" and "o" must be treated in a separate flocculation and sedimentation unit 21 prior to being mixed with the raw water since the requisite separation of suspended matter cannot take place in the pre-cleaning section of osmosis unit 7.

While a preferred embodiment has been shown and described, various modifications and substitutions may be made thereto without departing from the spirit and scope of the invention. Accordingly, as shown in part by the above-described alternative procedures, modifications and substitutions may be made to the disclosed embodiment without departing from the spirit and scope of the invention.

TABLE 1

| Emission from a 700 MW power station with coal fired steam generator, wet type cooling tower, flue gas desulphurization unit and wet ash conveyor |
|---|
| A with conventional water treatment (Decarbonization, full demineralization and condensate demineralization) |
| B with water treatment according to the invention (reverse osmosis with (a) concentration and/or (b) stabilization whereby total salt content = 650 mg/l as NaCl |

TABLE 1-continued of the raw water
- CL content = 150 mg/l
- SO$_4$ content = 150 mg/l
- HCO$_3$ content = 350 mg/l and 1 = Reduction of the emission based on the conventional treatment in %
2 = Solids deposited by flocculation and sedimentation before the reverse osmosis unit installed for pre-cleaning

| Type of emission | Dimension | A | a | B | b |
|---|---|---|---|---|---|
| Total waste water | t/h | 460 | 6 | | 0 |
| | reduced 1 % | 0 | 99 | | 100 |
| Total salts | t/h | 1,4 | 1,0 | | 0 |
| | reduced 1 % | 0 | 29 | | 100 |
| Total solids c, d, e, f | t/h | 17,5 | 0,5 (0,8)$^2$ | | 2,5 (2,8)$^2$ |
| | reduced 1 % | 0 | 97 (95)$^2$ | | 86 (2,8)$^2$ |
| c Make-up water treatment | t/h | 1,0 | 0 (0,3)$^2$ | | 0 (0,3)$^2$ |
| d Ash cooling water and Filter washing water | t/h | 0,5 | 0,5 | | 0,5 |
| e Gypsum from the flue gas washer | t/h | 16,5 | 0 | | 0 |
| f Solids from the stabilization | t/h | — | 0 | | 2 |

TABLE 2

Reduction of the treatment plant outputs and the chemical requirement for the treatment of the water required for a 700 MW power station with coal fired steam generator, wet type cooling tower, flue gas desulphurization plant and wet ash conveyor A with conventional water treatment
B with water treatment according to the inventions
whereby a = with cations + mixed bed paralled flow conventional typ
b = with cation + mixed bed continuous opposed flow regeneration

| | Dim. | A | B | |
|---|---|---|---|---|
| Water requirement of the power station | t/h | 1700 | 1250 | |
| | reduced % | 0 | 27 | |
| Output of the make-up water unit | t/h | 1500 | 1000 | |
| | reduced % | 0 | 33 | |
| Evaporator output | t/h | 0 | 65 | |
| | reduced % | 100 | 35 | |
| Chemical requirement make-up water treatment | % | 100 | 15 | |
| Chemical requirement steam generator feedwater treatment | % | 100 | a 51 | b 26 |

What is claimed is:

1. In the operation of a thermal power station, the power station including steam turbines and a steam circulation system including a steam generator and a steam generator feed water treatment stage, the power station further including at least a first cooling tower and a cooling water circulation system including the cooling tower, an improved process for the production of makeup water for the cooling water and steam circulation systems including the steps of:
   providing water from a source to the power station;
   subjecting at least part of the source water to a first reverse osmosis treatment;
   delivering at least part of the permeate from the first reverse osmosis treatment as makeup water to the cooling water circulation system;
   mixing the concentrate from the first reverse osmosis treatment with at least some of the cooling tower blowdown water to form a first mixture;
   heating the said first mixture;
   subjecting the heated first mixture to a second reverse osmosis treatment;
   delivering at least a portion of the permeate resulting from the second reverse osmosis treatment as makeup water to the cooling water circulation system;
   subjecting the concentrate stream from the said second reverse osmosis treatment to a third reverse osmosis treatment;
   employing steam from the steam circulation system to heat the concentrate from the said third reverse osmosis treatment; and
   extracting the solid matter from the heated concentrate of the said third reverse osmosis treatment.

2. The process of claim 1 wherein the condensate resulting from the heating of the concentrate from the said third reverse osmosis treatment is employed to heat the said first mixture and wherein said process further comprises:
   mixing the said condensate with the permeate from the said third reverse osmosis treatment to form a second mixture; and
   delivering the said second mixture to the steam generator feed water treatment stage for conversion to steam circulation system makeup water.

3. The process of claim 2 wherein the steam generator feed water treatment stage produces steam circulation system makeup water and waste water and wherein said process further comprises:
   detoxification of the waste water from the steam generator feed water treatment stage;
   subjecting the detoxified waste water to an ammonia concentration process to produce a solution having a high ammonia concentration;
   removing heavy metals from the waste water subsequent to the ammonia concentration procedure; and
   heating the waste water stream subsequent to the metal removal with steam from the steam circulation system.

4. The process of claim 3 wherein the step of heating the waste water subsequent to metal removal comprises:
   subjecting the waste water to a fourth reverse osmosis treatment subsequent to removal of heavy metals therefrom;
   mixing the permeate from the said fourth reverse osmosis treatment with the said condensate and the permeate from the said third reverse osmosis treatment to form a feed stream for the steam generator feed water treatment stage; and
   heating the concentrate from the said fourth reverse osmosis treatment with steam from the steam circulation system.

5. The process of claim 1 wherein the step of heating the concentrate from the said third reverse osmosis treatment comprises delivering the said concentrate to an evaporator.

6. The process of claim 3 wherein the steps of heating the concentrate from the said third reverse osmosis treatment and heating the waste water from the steam generator feed water treatment stage subsequent to heavy metal removal each comprises:

delivering the stream to be heated to an evaporator.

7. The process of claim 1 wherein the power station further includes a flue gas desulfurizer in which the steam generator flue gas is washed with untreated source water and calcium sulfate is precipitated from the wash water in a sedimentation process to form a sludge, the process further comprising:

washing the calcium sulfate precipitate with a portion of the permeate from the said first reverse osmosis treatment;

removing suspended calcium sulfate from the precipitate wash water;

subjecting the wash water subsequent to suspended calcium sulfate removal to a fourth reverse osmosis treatment;

employing the permeate from the said fourth reverse osmosis treatment as a portion of the calcium sulfate precipitate wash water; and heating the concentrate stream from the said fourth reverse osmosis treatment with steam from the steam circulation system.

8. The process of claim 7 wherein the steps of heating the concentrate from the said third and fourth reverse osmosis treatments comprise:

delivering the said concentrate streams to an evaporator.

9. The process of claim 8 wherein the step of removing the suspended calcium sulfate from the wash water includes:

filtering the wash water to produce a waste water stream and a regenerate, the waste water stream being subjected to the said fourth reverse osmosis treatment; and wherein said process further comprises:

mixing the said regenerate with the concentrate from the fourth reverse osmosis treatment prior to heating.

10. The process of claim 1 wherein the power station employs coal as a fuel and further comprises an ash cooling system wherein ash from the steam generator is washed with untreated water from the source, the process further comprising:

mixing the cooling water from the ash cooling system with backwashing water from the steam generator feed water treatment system to form a second mixture;

removing suspended particulate matter from the said second mixture; and adding the second mixture subsequent to suspended matter removal with the source water upstream of the said first reverse osmosis treatment.

11. The process of claim 6 wherein the power station further includes a flue gas desulfurizer in which the steam generator flue gas is washed with untreated source water and calcium sulfate is precipitated from the wash water in a sedimentation process to form a sludge, the process further comprising:

washing the calcium sulfate precipitate with a portion of the permeate from the said first reverse osmosis treatment;

removing the suspended calcium sulfate from the precipitate wash water;

subjecting the wash water subsequent to suspended calcium sulfate removal to a fourth reverse osmosis treatment;

employing the permeate from the said fourth reverse osmosis treatment as a portion of the calcium sulfate precipitate wash water; and delivering the concentrate stream from the said fourth reverse osmosis treatment to the evaporator.

12. The process of claim 1 wherein the power station employs coal as a fuel and further comprises an ash cooling system wherein ash from the steam generator is washed with untreated water from the source, the process further comprising:

mixing the cooling water from the ash cooling system with backwashing water from the steam generator feed water treatment system to form a third mixture;

removing suspended particulate matter from the said third mixture; and adding the third mixture subsequent to suspended matter removal with the source water upstream of the said first reverse osmosis treatment.

* * * * *